US012565073B2

(12) United States Patent
Konada et al.

(10) Patent No.: US 12,565,073 B2
(45) Date of Patent: Mar. 3, 2026

(54) ELECTRONIC SUSPENSION CONTROL APPARATUS

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 17/950,374

(22) Filed: Sep. 22, 2022

(65) Prior Publication Data

US 2023/0093936 A1     Mar. 30, 2023

(30) Foreign Application Priority Data

Sep. 27, 2021     (JP) ................................. 2021-156605

(51) Int. Cl.
    *B60G 17/0165*          (2006.01)
    *B60G 17/016*           (2006.01)
(52) U.S. Cl.
    CPC ..... *B60G 17/0165* (2013.01); *B60G 17/0164* (2013.01); *B60G 2400/824* (2013.01); *B60G 2400/95* (2013.01)
(58) Field of Classification Search
    CPC ............ B60G 17/0165; B60G 17/0164; B60G 2400/824; B60G 2400/95; B60G 17/018; B60G 17/06; B60G 2202/42; B60G 2202/441; B60G 2400/0523;
    (Continued)

(56) References Cited

U.S. PATENT DOCUMENTS

| | | | | |
|---|---|---|---|---|
| 2015/0224845 A1* | 8/2015 | Anderson | ................. | F03G 7/08 |
| | | | | 701/37 |
| 2016/0001621 A1* | 1/2016 | Kato | ...................... | B60G 17/06 |
| | | | | 188/267 |
| 2020/0324604 A1 | 10/2020 | Ohno et al. | | |

FOREIGN PATENT DOCUMENTS

| | | | | |
|---|---|---|---|---|
| CN | 111806183 A | 10/2020 | | |
| JP | 2002-283822 A | 10/2002 | | |
| JP | 2007083813 A * | 4/2007 | ............. | B60G 13/14 |

(Continued)

OTHER PUBLICATIONS

Office Action received in corresponding Japanese application No. 2021-156605 dated Feb. 28, 2023 with English translation (8 pages).

(Continued)

*Primary Examiner* — Scott A Reinbold
(74) *Attorney, Agent, or Firm* — Rankin, Hill & Clark LLP

(57)     ABSTRACT

An electronic suspension control apparatus of the invention is an apparatus that controls an electronic suspension having an electric motor, and under a predetermined operation condition, gradually decreases a thrust force command for the electronic suspension and performs short circuit control on the electric motor once the thrust force command falls to or below a predetermined value. The operation condition is either detection of a command giving a prior notice of stopping power supply to the electronic suspension, a short circuit command as a measure against a collision, detection of a predetermined decelerating vehicle speed, or detection, by a preview sensor, of a change in a road surface which is equal to or above a predetermined value.

4 Claims, 5 Drawing Sheets

(58) Field of Classification Search
CPC ........ B60G 2400/204; B60G 2400/252; B60G
2500/10; B60G 2600/08
USPC ........................................................ 701/37
See application file for complete search history.

(56) References Cited

FOREIGN PATENT DOCUMENTS

| | | | |
|---|---|---|---|
| JP | 2007-168611 A | | 7/2007 |
| JP | 2009-202623 A | | 9/2009 |
| JP | 2010195295 A | * | 9/2010 |
| JP | 2011-183919 A | | 9/2011 |
| JP | 2012-131395 A | | 7/2012 |
| JP | 2016-013794 A | | 1/2016 |
| JP | 2018-158729 A | | 10/2018 |

OTHER PUBLICATIONS

Chinese Office Action received in corresponding Chinese application No. 202211137210.6 dated Mar. 1, 2025 with English translation (13 pages).

* cited by examiner

ELECTRONIC SUSPENSION CONTROL APPARATUS

CROSS-REFERENCE TO RELATED APPLICATION

This application is based upon and claims priority from the Japanese Patent Application No. 2021-156605, filed on Sep. 27, 2021, the entire contents of which are incorporated herein by reference.

BACKGROUND OF THE INVENTION

1. Field of the Invention

The present invention relates to an electronic suspension control apparatus.

2. Description of the Related Art

An electronic suspension apparatus has conventionally known, which is provided between a vehicle body and a wheel of a vehicle and includes an electromagnetic actuator that, using an electric motor, generates a driving force for attenuating vibrations of the vehicle (see, for example, JP2012-131395A). The electromagnetic actuator is configured including a ball screw mechanism in addition to the electric motor. This electromagnetic actuator operates to generate a driving power for attenuating vibrations of the vehicle by converting rotational motion of the electric motor into linear motion of the ball screw mechanism. There are linear electromagnetic actuators as well.

JP2012-131395A describes a suspension apparatus that transforms the voltage of an output from a high-voltage battery with a DC/DC converter and supplies electricity to a motor of an electric actuator. In the suspension apparatus, the output voltage from the DC/DC converter is corrected by subtraction of fluctuating voltage acquired in accordance with consumed power indicating the actuation status of the electric actuator, and the output voltage from the DC/DC converter is adjusted so that the corrected voltage may be close to a reference voltage.

In an electronic suspension including an electromagnetic actuator, like the one shown in JP2012-131395A, when the electromagnetic actuator is switched to short circuit control or when power supply to the electromagnetic actuator is stopped, the stroke position of the electronic suspension abruptly changes to the natural length, which may result in an uncomfortable ride for an occupant.

SUMMARY OF THE INVENTION

The present invention has been made in view of the above circumstances and aims to reduce the possibility of lowering ride comfort for an occupant while improving traffic security.

To solve the problem described above, an electronic suspension control apparatus of the present invention is an apparatus that controls an electronic suspension having an electric motor, and under a predetermined operation condition, the electronic suspension control apparatus gradually decreases a thrust force command for the electronic suspension and performs short circuit control on the electric motor once the thrust force command falls to or below a predetermined value.

According to the electronic suspension control apparatus of the present invention, when a switch is to be made to the short circuit control while the electric actuator is outputting a thrust force, except for cases of an emergency or failure, the short circuit control is performed after a thrust force command is gradually decreased, and thus, the stroke position of the electronic suspension does not change to the natural length abruptly, allowing an occupant not to experience an uncomfortable ride.

DETAILED DESCRIPTION OF THE EMBODIMENTS

Figure 1:
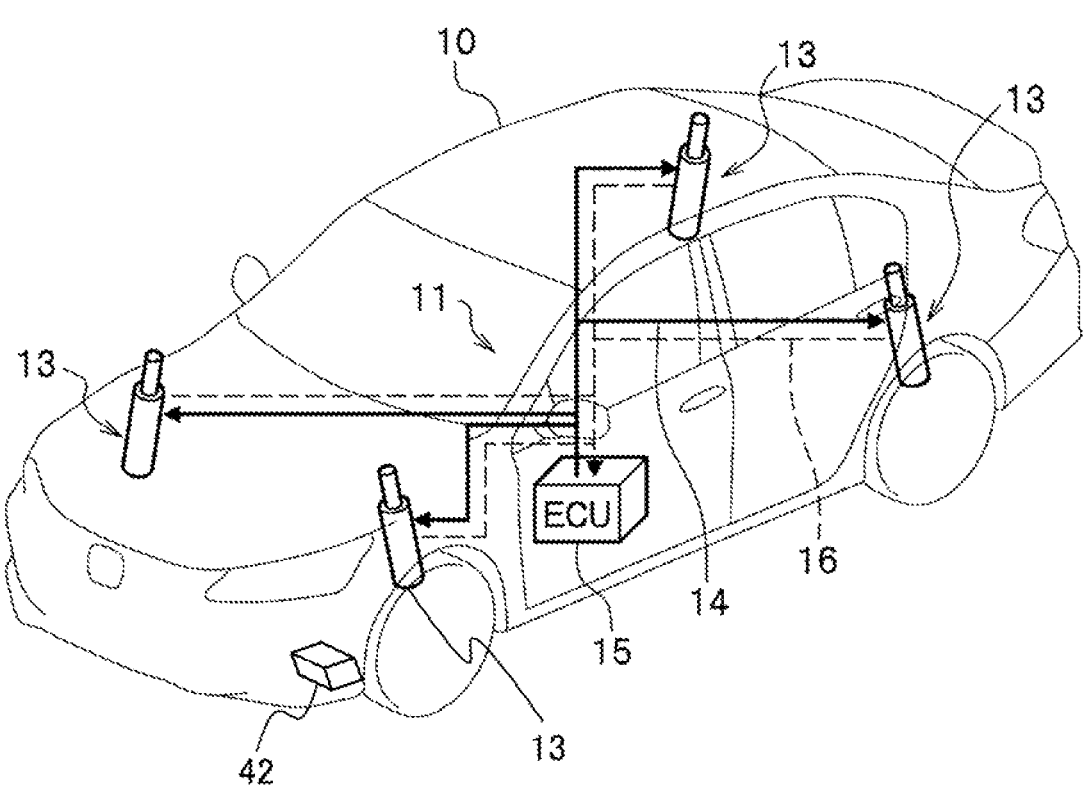
FIG. 1 is a diagram of the overall configuration of a vehicle equipped with an electronic suspension apparatus according to an embodiment.

With reference to the drawings where appropriate, a detailed description is given below of an electronic suspension control apparatus (hereinafter referred to as an ECU 15) of an embodiment of the present invention, the ECU 15 making a switch to short circuit control while an electric actuator is outputting a thrust force.

Note that throughout the drawings that are referred to hereinbelow, members having the same function are denoted by the same reference numeral. Also, the size or shape of a member may be depicted schematically in a modified or exaggerated way for the sake of illustration convenience.

First, the common basic configuration of an electronic suspension apparatus 11 according to an embodiment of the present invention is described with reference to FIGS. 1 and 2.

FIG. 1 is a diagram of the common overall configuration of the electronic suspension apparatus 11 according to the embodiment of the present invention. FIG. 2 is a partial sectional view of an electromagnetic actuator 13 forming part of the electronic suspension apparatus 11.

The electronic suspension apparatus 11 according to the embodiment of the present invention is, as shown in FIG. 1, configured including a plurality of electromagnetic actuators 13 for the respective wheels of a vehicle 10 and a single electronic control unit (ECU) 15. The plurality of electromagnetic actuators 13 and the ECU 15 are mutually connected with drive signal lines 14 (see solid lines in FIG. 1) through which the ECU 15 drives the respective electromagnetic actuators 13 and rotation angle signal lines 16 (see broken lines in FIG. 1) through which the plurality of electromagnetic actuators 13 each send the ECU 15 a rotation angle signal of an electric motor 31 (see FIG. 2).

In the present embodiment, the electromagnetic actuators 13 are provided for the front wheels (the left front wheel and the right front wheel) and the rear wheels (the left rear wheel and the right rear wheel), i.e., there are four electromagnetic actuators 13 in total. The electromagnetic actuators 13 provided for the respective wheels are each driven and controlled independently of the other ones in accordance with the extending and contracting action of the corresponding wheel.

In the embodiment of the present invention, the plurality of electromagnetic actuators 13 have a common configuration unless otherwise noted. Thus, a description is given about the configuration of one of the electromagnetic actuators 13, omitting descriptions of the other electromagnetic actuators 13.

A preview sensor 42 is a CCD camera provided frontward of the wheels and acquires information on the travel road surface of the road on which the vehicle 10 is going to travel, based on a travel road surface image acquired of the front of the vehicle 10. Alternatively, a laser sensor, an ultrasonic sensor, or the like may be used as the preview sensor 42 to acquire the information on the travel road surface.

Figure 2:
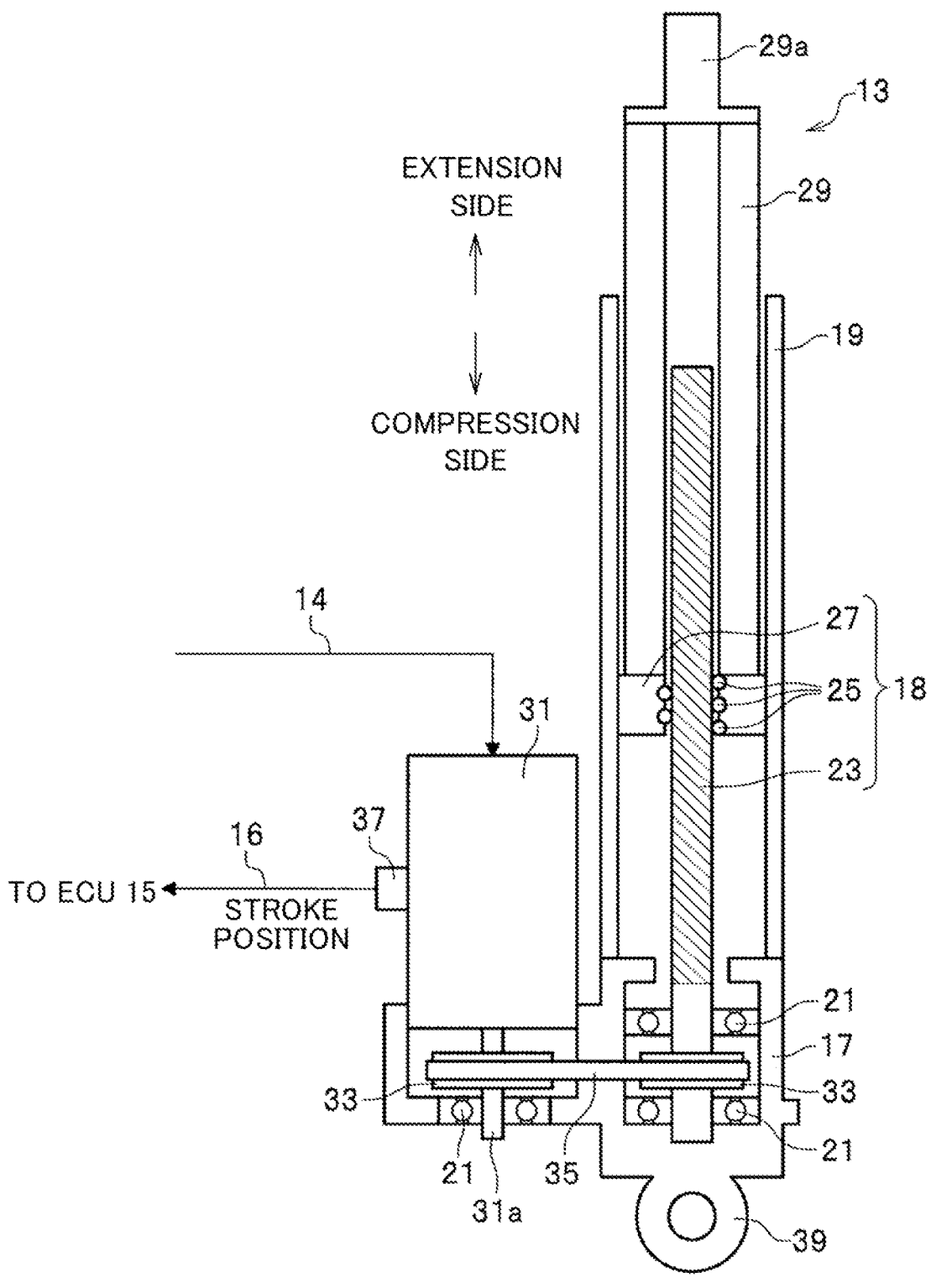
FIG. 2 is a partial sectional view of an electromagnetic actuator in the electronic suspension apparatus according to the embodiment.

The electromagnetic actuator 13 is configured including, as shown in FIG. 2, a base housing 17, an outer tube 19, ball bearings 21, a ball screw shaft 23, a plurality of balls 25, a nut 27, and an inner tube 29.

The base housing 17 supports a base end side of the ball screw shaft 23 via the ball bearings 21 such that the ball screw shaft 23 can rotate about its axis. The outer tube 19 is provided to the base housing 17 and houses a ball screw mechanism 18 which includes the ball screw shaft 23, the plurality of balls 25, and the nut 27. The plurality of balls 25 rotationally move along a screw groove on the ball screw shaft 23. The nut 27 engages with the ball screw shaft 23 via the plurality of balls 25 and converts the rotational motion of the ball screw shaft 23 into linear motion. The inner tube 29 connected to the nut 27 changes in position, integrally with the nut 27, in the direction of the axis of the outer tube 19.

To transmit rotational motion to the ball screw shaft 23, the electromagnetic actuator 13 includes, as shown in FIG. 2, the electric motor 31, a pair of pullies 33, and a belt member 35. The electric motor 31 is provided at the base housing 17 in such a manner as to be side by side with the outer tube 19. One of the pullies 33 is attached to a motor shaft 31*a* of the electric motor 31, and the other one of the pullies 33 is attached to the ball screw shaft 23. The belt member 35 is looped around the pair of pullies 33 to transmit the rotational driving force of the electric motor 31 to the ball screw shaft 23.

A resolver 37 is provided to the electric motor 31 to detect a rotation angle signal of the electric motor 31. The rotation angle signal of the electric motor 31 detected by the resolver 37 is sent to the ECU 15 through the rotation angle signal line 16. The electric motor 31 is driven and rotated by a corresponding one of the drive signal lines 14 connected from the ECU 15 to the plurality of electromagnetic actuators 13.

Note that as shown in FIG. 2, the present embodiment employs a layout such that the motor shaft 31*a* of the electric motor 31 and the ball screw shaft 23 are disposed substantially in parallel to each other and connected, so as to reduce the axial dimension of the electromagnetic actuator 13. However, a different layout may be employed, in which the motor shaft 31*a* of the electric motor 31 and the ball screw shaft 23 are disposed coaxially and connected.

It goes without saying that the structure of the electromagnetic actuator 13 of the embodiment is not limited to this, and other electromagnetic active suspension such as one of a linear motor type may be employed.

As shown in FIG. 2, the electromagnetic actuator 13 according to the present embodiment is provided with a connection portion 39 at a lower end portion of the base housing 17. This connection portion 39 is connected and fixed to an unsprung member (not shown) (such as a lower arm or a knuckle on the wheel side). Meanwhile, an upper end portion 29*a* of the inner tube 29 is connected and fixed to a sprung member (not shown) (such as a strut tower part on the vehicle body side). In summary, the electromagnetic actuator 13 is disposed side by side with a spring member (not shown) provided between the vehicle body and a wheel of the vehicle 10.

The electromagnetic actuator 13 thus configured operates as follows. Specifically, as an example, a case is discussed where a thrust force related to upward vibration is inputted to the connection portion 39 from the wheel side of the vehicle 10. In this case, the inner tube 29 and the nut 27 integrally try to move downward relative to the outer tube 19 to which the thrust force related to upward vibration has been exerted. In response to this, the ball screw shaft 23 tries to rotate in a direction to follow the downward movement of the nut 27. In this event, a driving force is generated to rotate the electric motor 31 in a direction to inhibit the downward movement of the nut 27. This rotational driving force for the electric motor 31 is transmitted to the ball screw shaft 23 via the belt member 35.

By thus exerting counteracting force (attenuating force) to the ball screw shaft 23 to counteract the thrust force related to upward vibration, vibration which would otherwise be transmitted from the vehicle wheel side to the vehicle body side is attenuated.

Figure 3:
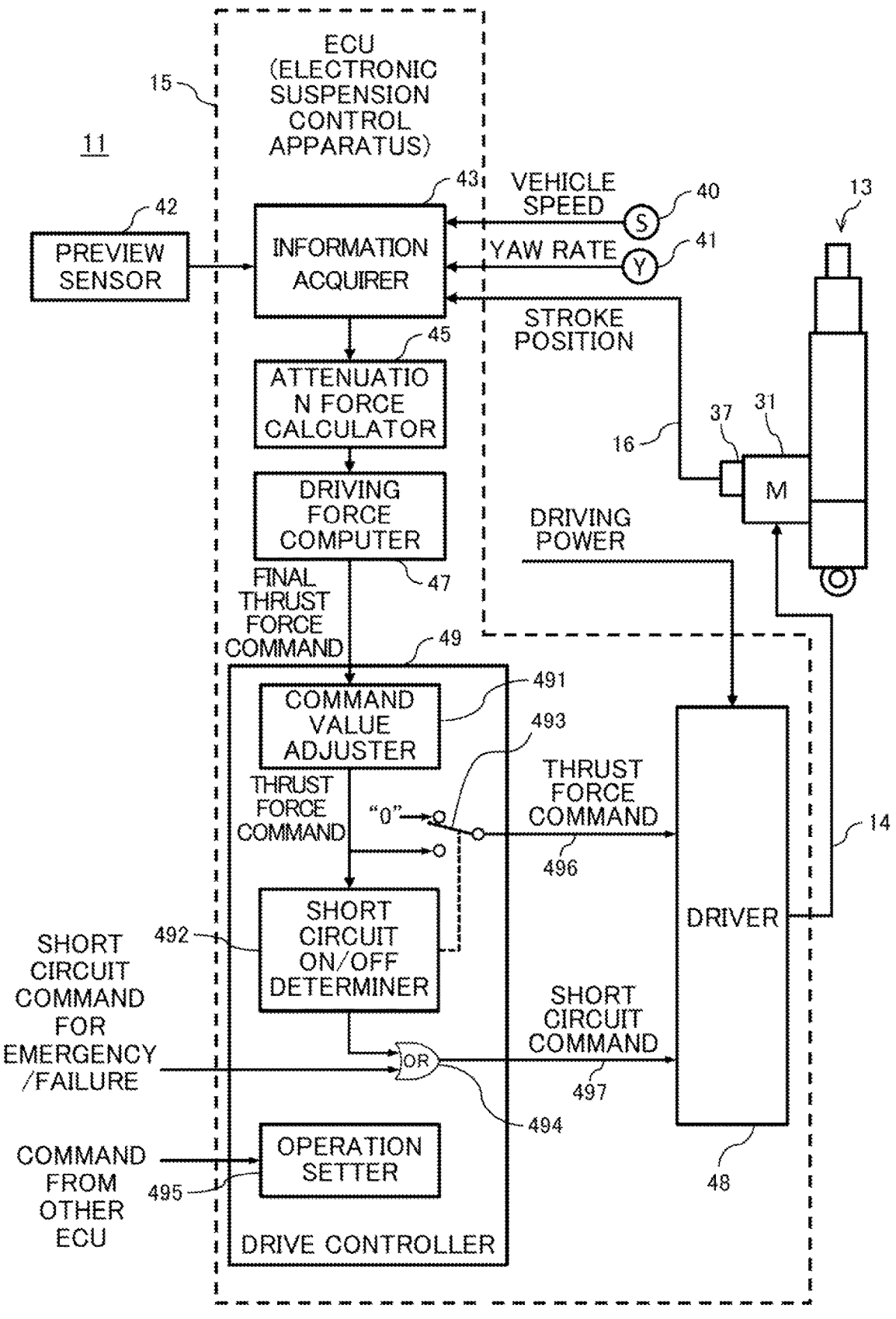
FIG. 3 is a diagram of a configuration inside and around an electronic suspension control apparatus of the embodiment.

Next, a configuration inside and around the ECU 15 of the electronic suspension apparatus 11 according to the embodiment of the present invention is described with reference to FIG. 3. FIG. 3 is a diagram of a configuration inside and around the ECU 15 of the electronic suspension apparatus 11 according to the embodiment of the present invention.

The ECU 15 is configured including a microcomputer that performs various kinds of computation processing. The ECU 15 has a drive control function implemented by executing a program, the drive control function being for generating a driving force for attenuating vibrations of the vehicle body by driving and controlling each of the plurality of electromagnetic actuators 13 based on a stroke position calculated from a rotation angle signal of the electric motor 31 detected by the resolver 37 and transmitted through the corresponding rotation angle signal line 16.

To implement this drive control function, the ECU 15 is configured including, as shown in FIG. 3, an information acquirer 43, an attenuation force calculator 45, a driving force computer 47, and a drive controller 49.

The information acquirer 43 acquires, as stroke-position-related chronological information, rotation angle signals of the electric motor 31 detected by the resolver 37 and then acquires information on a stroke velocity SV by differentiating the stroke-position-related chronological information with respect to time.

The information acquirer 43 also acquires information on inversion related to the stroke direction based on the stroke-position-related chronological information and information on a post-inversion stroke amount AS.

The information acquirer 43 also acquires, as shown in FIG. 3, information on a vehicle speed detected by a vehicle speed sensor 40, information on a yaw rate (steer amount) detected by a yaw rate sensor 41, and information on the travel road surface on which the vehicle 10 is going to travel which is obtained by the preview sensor 42 provided at a front side of the vehicle 10.

The information acquired by the information acquirer 43, namely the information on the stroke velocity SV, the information on inversion related to the stroke direction, the information on the post-inversion stroke amount AS, and the information on the vehicle speed, the yaw rate, and the travel road surface, are sent to the attenuation force calculator 45.

Based on the information on the stroke velocity SV acquired by the information acquirer 43, the attenuation force calculator 45 calculates a target attenuation force which is an attenuation operation target value for the electromagnetic actuator 13. Also, based on the information on the post-inversion stroke amount AS acquired by the information acquirer 43, the attenuation force calculator 45 corrects the target attenuation force so that, in principle, the smaller the stroke amount AS, the weaker the target attenuation force.

The corrected target attenuation force calculated by the attenuation force calculator 45 is sent to the driving force computer 47.

The driving force computer 47 receives input of the corrected target attenuation force calculated by the attenuation force calculator 45, and finds, by computation, drive control information for achieving the target attenuation force at the electromagnetic actuator 13. The drive control information which is a computation result obtained by the driving force computer 47 is sent to the drive controller 49 as a thrust force command.

As will be described in detail later, a thrust force command immediately before short circuit control of the electromagnetic actuator 13 is referred to as a final thrust force command.

Following the thrust force command sent from the driving force computer 47, the drive controller 49 notifies a driver 48 of a thrust force command 496 and a short circuit command 497, the driver 48 being configured to drive the electric motors 31 in the respective plurality of electromagnetic actuators 13.

The driver 48 is supplied with driving power from a battery mounted in the vehicle 10 and drives each electric motor 31 using an inverter circuit through the drive signal line 14 based on the thrust force command 496 that the driver 48 has been notified of by the drive controller 49.

Also, based on the short circuit command 497 that the driver 48 has been notified of by the drive controller 49, the driver 48 (the inverter circuit) that controls the electric motor 31 performs short circuit control of the electromagnetic actuator 13 by short-circuiting the drive signal line 14 by switching each field-effective transistor (FET) or insulated gate bipolar transistor (IGBT) of the driver 48 so that each armature coil in the electric motor 31 may be electrically connected. Also, based on the short circuit command 497 that the driver 48 has been notified of by the drive controller 49, the driver 48 may short circuit the drive signal line 14 so that each armature coil in the electric motor 31 may be connected via a resistor. Further, the driver 48 may perform short circuit control of the electromagnetic actuator 13 by providing, on the driver 48 side or the electric motor 31 side, a relay that short circuits each armature coil in the electric motor 31. In this case, the short circuit may be done via a resistor.

The short circuit control of the electromagnetic actuator 13 allows an attenuation force to be generated in accordance with a change in the stroke of the electromagnetic actuator 13 even if power supply is stopped. Thus, vibrations of the vehicle height of the travelling vehicle 10 can be mitigated. Also, even when the vehicle 10 is stopped, an attenuation force is generated in accordance with a change in the weight of a load in the vehicle 10. Thus, a positional change of the vehicle height can be mitigated.

Next, the configuration of the drive controller 49 that handles the short circuit command is described.

When short circuit control of the electromagnetic actuator 13 is to be performed as set by an operation setter 495 to be described later, a command value adjuster 491 takes a thrust force command from the driving force computer 47 as the value of a final thrust force command, and adjusts the gain of the thrust force command so that the value may decrease gradually from the value of the final thrust force command.

Figure 4:
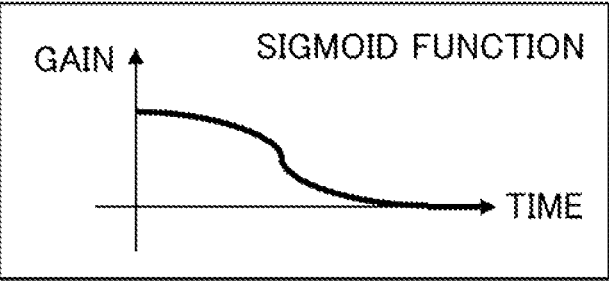
FIG. 4 is a diagram showing an example of gain adjustment by a command value adjuster in the electronic suspension control apparatus.

The gain of the command value adjuster 491 has the properties of being attenuated as time passes as shown in FIG. 4, and examples include one with the properties of decreasing attenuation nonlinearly such as, for example, a Sigmoid function, or one with the properties of decreasing the gain linearly. It is also possible to have the properties of a step function with a step by step decrease.

By using the properties as shown in FIG. 4 for the gain of the thrust force command, the command value adjuster 491 adjusts the thrust force command smoothly with a small change between the gain at the start of the adjustment and the gain at the end of the adjustment. This prevents an abrupt change in the stroke position when short circuit control of the electromagnetic actuator 13 is performed and enables smooth transition into the short circuit control, thus allowing an occupant not to experience an uncomfortable ride.

A short-circuit ON/OFF determiner 492 determines whether the value of the thrust force command adjusted by the command value adjuster 491 is equal to or below a predetermined value. If the thrust force command is equal to or below the predetermined value, the short-circuit ON/OFF determiner 492 determines this as "ON" for the short circuit control and determines that a short circuit command is to be outputted to perform short circuit control of the electromagnetic actuator 13. Note that the predetermined value as the threshold used for this determination is appropriately defined considering a change in ride quality caused by transition of the electromagnetic actuator 13 into the short circuit control.

The time for which the command value adjuster 491 adjusts the thrust force command depends on the determination threshold used by the short-circuit ON/OFF determiner 492 and the attenuation properties of the gain of the command value adjuster 491. From the perspective of reducing a change caused by the short circuit control of the electromagnetic actuator 13, the smaller the determination threshold, the better. However, the time it takes for the adjustment would be longer then. For this reason, a predetermined determination threshold and a predetermined adjustment time are set, and the attenuation properties of the gain are defined. The attenuation properties of the gain may also be defined according to the operation conditions of the command value adjuster 491 and the short-circuit ON/OFF determiner 492 to be described later.

A thrust force command outputter 493 is an output part that selects either the thrust force command adjusted by the command value adjuster 491 or a thrust force command with a value "0" as a thrust force command and notifies the driver 48 of the thrust force command by means of the thrust force command 496.

The selection of the thrust force command is performed based on the result of the determination by the short-circuit ON/OFF determiner 492. Specifically, a thrust force command with a value "0" is selected when the result of the short circuit control determination by the short-circuit ON/OFF determiner 492 is "ON," and the thrust force command adjusted by the command value adjuster 491 is selected when the result of the short circuit control determination is "OFF." Then, the driver 48 is notified of the thrust force command thus selected.

A short circuit command outputter 494 is an output part that notifies the driver 48 of either a short circuit command based on the "ON" determination result obtained by the short-circuit ON/OFF determiner 492 or a short circuit command based on an emergency or failure of the vehicle 10 detected by other ECU. Thus, in case of a need for urgent, instant short circuit control, the driver 48 is notified of a short circuit command without the command value adjuster 491 performing thrust force command adjustment, and immediately performs short circuit control of the electromagnetic actuator 13. In other words, in a case where a short circuit command is given because other ECU detects an emergency or failure of the vehicle 10, short circuit control of the electromagnetic actuator 13 takes top priority, disregarding degradation in ride quality (and valuing emergency braking or the like of the vehicle 10 (traffic safety) and protection from electric shock from high voltage).

As will be described in detail later, the operation setter 495 causes the command value adjuster 491 and the short-circuit ON/OFF determiner 492 to start operating based on an operation condition such as a short circuit command for the electronic suspension apparatus 11 from other ECU. More specifically, if there is no command from other ECU, the drive controller 49 notifies, from the thrust force command outputter 493, the driver 48 of the thrust force command from the driving force computer 47, by means of the thrust force command 496. The short circuit command outputter 494 does not notify the driver 48 of the short circuit command 497 except for a short circuit command upon an emergency or failure.

The operation setter 495 causes the command value adjuster 491 and the short-circuit ON/OFF determiner 492 to start operating when any of the following operation conditions is met: (1) a short circuit command for taking measures against a collision is inputted, (2) a vehicle speed of a certain speed or below is detected, (3) a vehicle power-off command is inputted, (4) a drastic change in the travel road surface is detected, (5) power supply is to be stopped, (6) the electromagnetic actuator 13 does not operate normally due to a failure or the like, (7) the ECU 15 detects error or does not operate normally, and (8) a decrease in power available from the drive power source of the vehicle.

Specifically, the operation condition (1) is a case of performing short circuit control of the electromagnetic actuator 13 when power supply of high voltage to the electronic suspension apparatus 11, which is outside of the vehicle body, is to be stopped as a measure against a collision. In response to a short circuit command that other ECU gives as a prior notice before stopping power supply, the operation setter 495 causes the command value adjuster 491 and the short-circuit ON/OFF determiner 492 to start operating.

In this case, the time for which the command value adjuster 491 adjusts the thrust force command is from the notification of the short circuit command to the stop of power supply, and is equal to or shorter than a time elapsed until the stop of power supply indicated by the prior notice.

In the electronic suspension apparatus 11, short circuit control is performed after the thrust force of the electromagnetic actuator 13 is gradually decreased. Thus, the stroke position of the electronic suspension does not change to the natural length abruptly, which allows an occupant not to experience an uncomfortable ride.

By stopping power supply of high voltage to the electronic suspension apparatus 11 after performing short circuit control of the electromagnetic actuator 13, measures against electric shock or the like in the event of a collision can be taken.

In the operation condition (2), the operation setter 495 acquires a vehicle speed detected by the vehicle speed sensor 40 from the information acquirer 43, and upon detection of a predetermined decelerating vehicle speed, causes the command value adjuster 491 and the short-circuit ON/OFF determiner 492 to start operating. Upon detection of an even lower vehicle speed after that, power supply of high voltage to the electronic suspension apparatus 11 is stopped for safety (prevention of electric shock).

In this case, the time for which the command value adjuster 491 adjusts the thrust force command is equal to or shorter than a predetermined time of deceleration from the vehicle speed determined by the operation setter 495 to the vehicle speed at which power supply is stopped.

In the electronic suspension apparatus 11, short circuit control is performed after the thrust force of the electromagnetic actuator 13 is gradually decreased, and after that, power supply is stopped. Thus, the stroke position of the electronic suspension apparatus 11 does not change to the natural length abruptly, which allows an occupant not to experience an uncomfortable ride.

In the operation condition (3), in response to a vehicle power off command (prior notice command) for the vehicle 10 from other ECU, the operation setter 495 causes the command value adjuster 491 and the short-circuit ON/OFF determiner 492 to start operating. Power supply to the electronic suspension apparatus 11 is stopped after short circuit control of the electromagnetic actuator 13 is performed.

In this case, the time for which the command value adjuster 491 adjusts the thrust force command is equal to or shorter than a time from the power off command (prior notice command) from other ECU to actually stopping the power supply.

In the electronic suspension apparatus 11, short circuit control is performed after the thrust force of the electromagnetic actuator 13 is gradually decreased, and thus, the stroke position of the electronic suspension apparatus 11 does not change to the natural length abruptly, which allows an occupant not to experience an uncomfortable ride. Also, because an attenuation force is generated at the electromagnetic actuator 13 which is being short-circuit controlled, vibrations of the vehicle height of the vehicle 10 due to the stop of power supply can be reduced.

In the operation condition (4), when information on the travel road surface on which the vehicle 10 is going to travel that the information acquirer 43 acquires from the preview sensor 42 is a drastic change amount indicative of a bumpy surface that the electronic suspension apparatus 11 cannot handle, i.e., when the preview sensor detects a road surface change of a predetermined value or above, the operation setter 495 causes the command value adjuster 491 and the short-circuit ON/OFF determiner 492 to start operating.

Because, in the electronic suspension apparatus 11, short circuit control is performed after the thrust force of the electromagnetic actuator 13 is gradually decreased, the electromagnetic actuator 13 can be prevented from breaking due to travelling on a bumpy surface. Moreover, because the stroke position of the electronic suspension apparatus 11 does not change to the natural length abruptly due to the short circuit control of the electromagnetic actuator 13, a minimum ride quality can be secured for an occupant.

In the operation condition (5), for example, in a case where power supply to the electronic suspension apparatus 11 is to be stopped because an operation abnormality of the battery in the vehicle 10 is detected while the vehicle 10 is travelling, the operation setter 495 causes the command value adjuster 491 and the short-circuit ON/OFF determiner 492 to start operating in response to a power supply stop command (prior notice command) given from other ECU before the power supply is stopped. Power supply to the electronic suspension apparatus 11 is stopped after short circuit control is performed on the electromagnetic actuator 13.

In this case, the time for which the command value adjuster 491 adjusts the thrust force command is equal to or shorter than a time from the power supply stop command (prior notice command) from other ECU to actually stopping the power supply.

In the electronic suspension apparatus 11, short circuit control is performed after the thrust force of the electromagnetic actuator 13 is gradually decreased, and thus, the stroke position of the electronic suspension apparatus 11 does not change to the natural length abruptly, which allows an occupant not to experience an uncomfortable ride. Also, because an attenuation force is generated at the electromagnetic actuator 13 which is being short-circuit controlled, vibrations of the vehicle 10 due to the stop of power supply can be reduced.

In the operation conditions (6) to (8), similarly, in the electronic suspension apparatus 11, short circuit control is performed after the thrust force of the electromagnetic actuator 13 is gradually decreased, and thus, the stroke position of the electronic suspension apparatus 11 does not change to the natural length abruptly, which allows an occupant not to experience an uncomfortable ride. Also, because an attenuation force is generated at the electromagnetic actuator 13 which is being short-circuit controlled, vibrations of the vehicle 10 due to the stop of power supply can be reduced.

The operation setter 495 may cause the command value adjuster 491 and the short-circuit ON/OFF determiner 492 to start operating in response to not only the operation conditions (1) to (8) but also a command given from other ECU in cases other than an emergency or failure.

Figure 5:
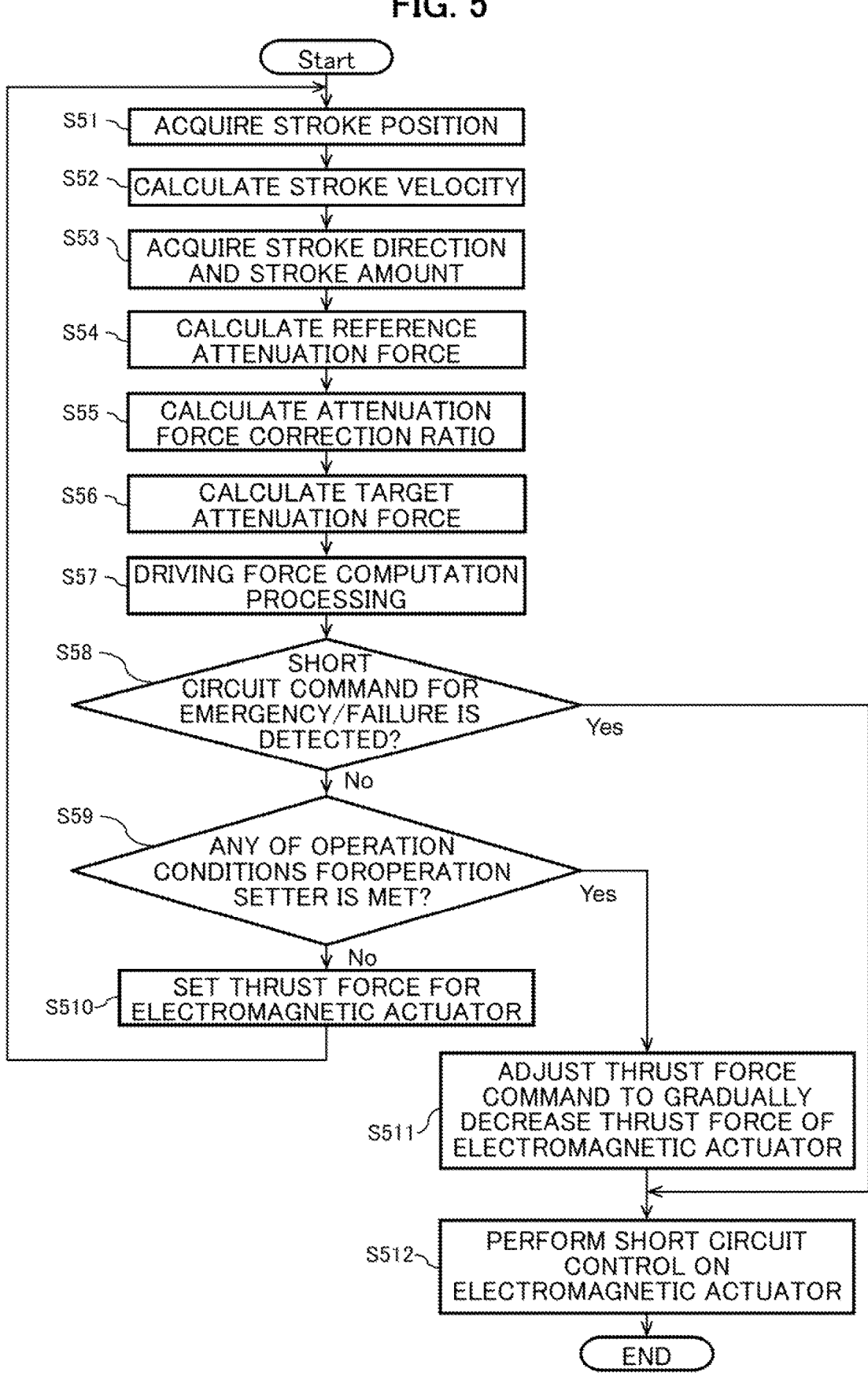
FIG. 5 is a flowchart of the operation of the electronic suspension control apparatus of the embodiment.

Next, the operation of the electronic suspension control apparatus of the embodiment is described using the flowchart of the operation of the electronic suspension control apparatus of the embodiment in FIG. 5.

In Step S51 (ACQUIRE STROKE POSITION), the information acquirer 43 of the ECU 15 acquires rotation angle signals of the electric motor 31 detected by the resolver 37, as stroke-position chronological information.

In Step S52 (CALCULATE STROKE VELOCITY), the information acquirer 43 of the ECU 15 calculates the stroke velocity SV by differentiating the stroke-position chronological information acquired in Step S51 with respect to time. The information on the stroke velocity SV thus calculated is sent to the attenuation force calculator 45.

In Step S53 (ACQUIRE STROKE DIRECTION AND STROKE AMOUNT), the ECU 15 sequentially receives, at a predetermined cycle time tcl, input of the stroke-position-related chronological information (a rotation angle signal of the electric motor 31) acquired in Step S51 and calculates a stroke difference amount ASD which is a difference between pieces of temporally adjacent pieces of the positional data. Also, based on the sign of the stroke difference amount ASD which is the result of the above calculation, the ECU 15 acquires a stroke direction and time information on inversion of the stroke direction.

Next, the ECU 15 acquires information on a post-inversion stroke amount AS, starting from an inversion point RP which is the stroke's halfway position.

In Step S54 (CALCULATE REFERENCE ATTENUATION FORCE), the attenuation force calculator 45 of the ECU 15 refers to the stroke velocity SV calculated (acquired) in Step S52 and what is stored in a reference attenuation force map 51 and finds the value of a reference attenuation force of a size corresponding to the stroke velocity SV.

In Step S55 (CALCULATE ATTENUATION FORCE CORRECTION RATIO), the attenuation force calculator 45 of the ECU 15 refers to the information acquired in Step S53, namely the information on inversion of the stroke direction and the information on the post-inversion stroke amount AS, and what is stored in an attenuation force correction map 53, and finds an attenuation force correction ratio RT of a size suitable for the stroke amount AS.

In Step S56 (CALCULATE TARGET ATTENUATION FORCE), the attenuation force calculator 45 of the ECU 15 calculates a corrected target attenuation force by multiplying the value of the reference attenuation force calculated in Step S54 by the value of the attenuation force correction ratio RT calculated in Step S55 (where $0.6 \leq RT \leq 1$ in the example of the present embodiment).

In Step S57 (DRIVING FORCE COMPUTATION PROCESSING), the driving force computer 47 of the ECU 15 finds, by computation, drive control information (a thrust force command) for achieving the corrected target attenuation force calculated in Step S56.

In Step S58, the drive controller 49 determines whether a short circuit command for an emergency or failure is detected. Processing proceeds to Step S512 if such a short circuit command is detected (Yes in S58), and proceeds to Step S59 if no such short circuit command is detected (No in S58).

In Step S59, the drive controller 49 determines whether any of the above-described operation conditions (1) to (5) for the operation setter 495 is met. Processing proceeds to Step S511 if any of those conditions is met (Yes in S59), and proceeds to Step S510 if none of those conditions is met (No in S59).

In Step S510, the drive controller 49 notifies the driver 48 of the drive control information (thrust force command) found in Step S57 and sets a thrust force for the electromagnetic actuator 13. Then, processing proceeds to Step S51 to periodically perform the processing from S51 to S510.

In Step S511, the drive controller 49 adjusts the drive control information (thrust force command) found in Step S57 by gradually decreasing the drive control information, and sequentially notifies the driver 48 of the adjusted thrust force command, thereby gradually reducing the thrust force of the electromagnetic actuator 13. Once the thrust force command is adjusted to or below a predetermined value, processing proceeds to Step S512.

In Step S512, the drive controller 49 performs short circuit control of the electromagnetic actuator 13 by notifying the driver 48 of a short circuit command, and ends the processing.

When switching the electric actuator to short circuit control while the electric actuator is outputting a thrust force, except for cases of an emergency or failure, the electronic suspension control apparatus (the ECU 15) of the embodiment gradually decreases and adjusts the thrust force of the electromagnetic actuator 13 and performs the short circuit control once the thrust force of the electromagnetic actuator 13 falls to or below the predetermined value. Thus, the stroke position of the electronic suspension apparatus 11 does not change to the natural length abruptly, which allows an occupant not to experience an uncomfortable ride.

Although the electromagnetic actuators 13 are described as high voltage components above, similar control can be performed for other high voltage components such as an in-wheel motor, an air conditioner, a motor for travelling, and an electric stabilizer.

The present invention is not limited to the embodiment described above and can be variously modified in design without departing from the gist thereof.

What is claimed is:

1. An electronic suspension control apparatus that controls an electronic suspension having an electric motor, wherein in response to a short circuit command as a measure against a collision, the short circuit command being given as a prior notice of a short circuit control before stopping power supply to the electronic suspension, the electronic suspension control apparatus decreases a thrust force of the electronic suspension, performs short circuit control on the electric motor once the thrust force falls to or below a predetermined value, and stops power supply of high voltage to the electronic suspension after performing the short circuit control wherein the electronic suspension control apparatus decreases the thrust force of the electronic suspension during a time from the prior notice of the short circuit control to the stop of the power supply.

2. An electronic suspension control apparatus that controls an electronic suspension having an electric motor, wherein upon detection of a predetermined decelerating vehicle speed, the electronic suspension control apparatus decreases a thrust force of the electronic suspension, performs short circuit control on the electric motor once the thrust force falls to or below a predetermined value, and stops power supply of high voltage to the electronic suspension after performing the short circuit control, wherein the electronic suspension control apparatus decreases the thrust force of the electronic suspension during a time of deceleration from the predetermined decelerating vehicle speed to a vehicle speed at which power supply to the electronic suspension is stopped.

3. The electronic suspension control apparatus according to claim 1, wherein in response to a detection, by a preview sensor, of a change in a road surface which is equal to or above a predetermined value, the electronic suspension control apparatus decreases the thrust force of the electronic suspension and performs short circuit control on the electric motor once the thrust force falls to or below the predetermined value.

4. The electronic suspension control apparatus according to claim 1, wherein in response to a detection of the short circuit command for the electronic suspension in an event other than an emergency or failure, the electronic suspension control apparatus decreases the thrust force of the electronic suspension and performs short circuit control on the electric motor once the thrust force falls to or below the predetermined value.

* * * * *